United States Patent
Jiang (10) Patent No.: US 11,729,876 B2
(45) Date of Patent: Aug. 15, 2023

(54) UNIFIED COLOR CONTROL METHOD FOR MULTI-COLOR LIGHT

(71) Applicant: Guangzhou Haoyang Electronic Co., Ltd., Guangdong (CN)

(72) Inventor: Weikai Jiang, Guangdong (CN)

(73) Assignee: GUANGZHOU HAOYANG ELECTRONIC CO., LTD., Guangdong (CN)

( * ) Notice: Subject to any disclaimer, the term of this patent is extended or adjusted under 35 U.S.C. 154(b) by 119 days.

(21) Appl. No.: 17/490,823

(22) Filed: Sep. 30, 2021

(65) Prior Publication Data

US 2022/0095427 A1    Mar. 24, 2022

Related U.S. Application Data

(63) Continuation of application No. PCT/CN2021/074298, filed on Jan. 29, 2021.

(30) Foreign Application Priority Data

Sep. 18, 2020   (CN) .......................... 202010983042.7

(51) Int. Cl.
    *H05B 45/20*    (2020.01)
(52) U.S. Cl.
    CPC .................................. *H05B 45/20* (2020.01)
(58) Field of Classification Search
    CPC ....... H05B 45/20; H05B 45/30; G06T 11/001; H04N 1/6086; Y02B 20/30
    See application file for complete search history.

(56) References Cited

U.S. PATENT DOCUMENTS

| | | | |
|---|---|---|---|
| 8,698,855 B2 * | 4/2014 | Kang | .................. G09G 5/02 |
| | | | 345/89 |
| 8,708,560 B2 * | 4/2014 | Kraemer | ................ H05B 45/22 |
| | | | 374/162 |

(Continued)

FOREIGN PATENT DOCUMENTS

| | | |
|---|---|---|
| CN | 106535406 A | 3/2017 |
| CN | 109005617 A | 12/2018 |
| CN | 111935870 A | 11/2020 |

*Primary Examiner* — Haissa Philogene
(74) *Attorney, Agent, or Firm* — Muncy, Geissler, Olds & Lowe, P.C.

(57) ABSTRACT

A unified color control method for a multi-color light, including the following control steps: S1: setting unified color control system and color implementation system for different light sources; S2: inputting a target color parameter, and calculating a target color chromaticity coordinate $(x_t, y_t)$ by the color control system according to the target color parameter; S3: calculating a primary-color duty ratio $D_i$ of corrected colors by the color implementation system using a linear programming equation according to the target color chromaticity coordinate $(x_t, y_t)$, and a chromaticity coordinate value $(x_i, y_i)$ and a maximum brightness value $Y_i$ of each primary color for each light source under a maximum duty ratio, in which i represents an i-th primary color; and S4: updating colors by the light sources according to the primary-color duty ratio $D_i$ of corrected colors in step S3.

11 Claims, 1 Drawing Sheet

(56) References Cited

U.S. PATENT DOCUMENTS

| | | | |
|---|---|---|---|
| 11,388,797 B2* | 7/2022 | Van Bommel | H05B 45/20 |
| 2010/0188022 A1* | 7/2010 | Gerlach | H05B 45/24 |
| | | | 315/312 |
| 2013/0134900 A1* | 5/2013 | Liang | H05B 45/20 |
| | | | 315/294 |
| 2013/0222858 A1* | 8/2013 | Yokoyama | G03G 15/5062 |
| | | | 358/2.1 |
| 2014/0333208 A1* | 11/2014 | Weaver | H05B 45/20 |
| | | | 315/294 |
| 2018/0098402 A1* | 4/2018 | Slaughter | H05B 45/22 |
| 2020/0172848 A1 | 6/2020 | Tatsuta et al. | |

* cited by examiner

UNIFIED COLOR CONTROL METHOD FOR MULTI-COLOR LIGHT

CROSS REFERENCE TO RELATED APPLICATIONS

The present application is a continuation of International Application No. PCT/CN2021/074298, filed on Jan. 29, 2021, which claims priorities from Chinese Patent Application No. 202010983042.7 filed on Sep. 18, 2020, all of which are hereby incorporated herein by reference.

TECHNICAL FIELD

The present invention relates to the technical field of color lights and more particularly to a unified color control method for a multi-color light.

BACKGROUND

Single-color or three primary-color LED light sources often fail to meet performance requirements of lighting on the stage in terms of brightness and color gamut, so that light sources such as based on four primary colors, five primary colors, six primary colors, and the like are gradually manufactured. However, there tends to be differences in light color and brightness between light sources, which not only leads to chromatic aberrations and brightness differences, but also causes difficulty in unified control color and severely degrades user experiences.

SUMMARY

The present invention thus provides a unified color control method for a multi-color light, which can uniformly control color and modify color control for different light sources, effectively eliminate differences between different light sources, unify corrected colors, reduce color hopping, and improve user experiences.

According to the present invention, the unified color control method for a multi-color light, including the following control steps:

S1: setting unified color control system and color implementation system for different light sources;

S2: inputting a target color parameter, and calculating a target color chromaticity coordinate $(x_t, y_t)$ by the color control system according to the target color parameter;

S3: calculating a primary-color duty ratio $D_i$ of corrected colors by the color implementation system using a linear programming equation according to the target color chromaticity coordinate $(x_t, y_t)$, and a chromaticity coordinate value $(x_i, y_i)$ and a maximum brightness value $Y_i$ of each primary color for each light source under a maximum duty ratio, in which i represents an i-th primary color; and S4: updating colors by the light sources according to the primary-color duty ratio $D_i$ of corrected colors in step S3.

By providing a unified color control system for a plurality of light sources with the number of primary colors greater than or equal to three, the unified color control method for a multi-color light according to the present technical solution can achieve unified target colors after correction and finally presents consistent corrected colors. When the same color control system is used for light sources of different models of lights, the color control system can correct properties for each light source separately when the same target color parameter is input, thereby avoiding mutual differences between light sources, achieving color synchronization between lights of the same model and different models, and achieving unified light output of corrected colors.

Setting a color control system in step S1 comprises the following steps:

S11: measuring respective color gamuts of different light sources to obtain a common color gamut;

S12: selecting virtual primary-color chromaticity coordinates $(x_1, y_1), (x_2, y_2) \ldots (x_n, y_n)$ and a virtual white point chromaticity coordinate $(x_w, y_w)$ of the color control system within the common color gamut; and S13: calculating a color conversion matrix $$\begin{bmatrix} (X_1) & (X_2) & & (X_n) \\ (Y_1) & (Y_2) & \ldots & (Y_n) \\ (Z_1) & (Z_2) & & (Z_n) \end{bmatrix}$$

for converting the target color parameter to the target color chromaticity coordinate $(x_t, y_t)$ according to the virtual primary-color chromaticity coordinates $(x_1, y_1), (x_2, y_2) \ldots (x_n, y_n)$ and the virtual white point chromaticity coordinate $(x_w, y_w)$.

The respective color gamuts of the light sources needs to be measured one by one or model by model or batch by batch to obtain as much color gamut data for each one/each model/each batch of light sources as possible. Considering that even an actual luminous efficiency of the same model/batch of light sources is distinct, it is preferable to perform measurement one by one to precisely unify light emission colors of all light sources.

Selecting virtual primary-color chromaticity coordinates $(x_1, y_1), (x_2, y_2) \ldots (x_n, y_n)$ and a virtual white point chromaticity coordinate $(x_w, y_w)$ of the color control system within the common color gamut can ensure that different light sources after correction have a common color display range, and avoids that some colors can only be displayed by a part of light sources.

Since the input target color parameter is generally an RGB color value in which the lowest value of each color is 0 and the highest value is 255, the target color parameter is first converted to a target color primary-color duty ratio within a multi-color light, which does not facilitate the color implementation system to convert and calculate the primary-color duty ratio of corrected colors. Therefore, the color conversion matrix $$\begin{bmatrix} (X_1) & (X_2) & & (X_n) \\ (Y_1) & (Y_2) & \ldots & (Y_n) \\ (Z_1) & (Z_2) & & (Z_n) \end{bmatrix}$$

can be used to quickly convert the target color primary-color duty ratio to the target color chromaticity coordinate $(x_t, y_t)$ and facilitates conversion with the corrected colors.

Step S11 is specifically as follows: measuring respective color gamuts of different light sources and recording into a chromaticity diagram to form a plurality of first convex polygons, a maximum value of each primary color forms a vertex when recording a color gamut of each light source in the chromaticity diagram, connecting lines of the plurality of vertices forms the first convex polygon, and an intersection of all the first convex polygons is the common color gamut. The common color gamut is a common color interval for all the light sources, the respective color gamuts of different light sources can be measured and recorded automatically using a device, and the common color gamut can be visually obtained using geometric construction within the chromaticity diagram and also can be automatically obtained using software according to the measured respective color gamuts of different light sources.

Step S12 is specifically as follows: making a second convex polygon with a number n as the number of edges within the common color gamut according to the number n of primary colors required to be virtual; in which n≥3; and setting vertex coordinates of the second convex polygon as $(x_1,y_1)$, $(x_2,y_2)$ ... $(x_n,y_n)$ respectively, taking the vertex coordinates of the second convex polygon as the virtual primary-color chromaticity coordinates of the color control system, and taking one of the coordinate points in the second convex polygon as the virtual white point chromaticity coordinate $(x_w,y_w)$. The number n of primary colors required to be virtual is a controlled variable number of light sources. The vertices of the second convex polygon can be freely selected as desired so long as the vertices are within the common color gamut. A larger area of the second convex polygon results in a wider color display range of light sources.

Step S13 comprises the following steps:

S13-1: calculating a primary-color tristimulus value $$\begin{bmatrix} X_1 & X_2 & & X_n \\ Y_1 & Y_2 & \ldots & Y_n \\ Z_1 & Z_2 & & Z_n \end{bmatrix}$$

and a white-point tristimulus value $$\begin{bmatrix} X_w \\ Y_w \\ Z_w \end{bmatrix}$$

that correspond to the virtual primary-color chromaticity coordinates $(x_i,y_i)$, $(x_2,y_2)$ ... $(x_n,y_n)$ and the virtual white point chromaticity coordinate $(x_w,y_w)$ respectively when the brightness is maximum in step S12, a brightness value at this time is 1, i.e., the values of $Y_1, Y_2 \ldots Y_n$ and $Y_w$ are all 1; and S13-2: calculating tristimulus values corresponding to each primary color unit using Grassmann's Law based on the primary-color tristimulus value $$\begin{bmatrix} X_1 & X_2 & & X_n \\ Y_1 & Y_2 & \ldots & Y_n \\ Z_1 & Z_2 & & Z_n \end{bmatrix}$$

and the white-point tristimulus value $$\begin{bmatrix} X_w \\ Y_w \\ Z_w \end{bmatrix}$$

in step S13-1, a tristimulus value corresponding to each primary color unit is a color conversion matrix $$\begin{bmatrix} (X_1) & (X_2) & & (X_n) \\ (Y_1) & (Y_2) & \ldots & (Y_n) \\ (Z_1) & (Z_2) & & (Z_n) \end{bmatrix},$$

thereby solving values of the color conversion matrix $$\begin{bmatrix} (X_1) & (X_2) & & (X_n) \\ (Y_1) & (Y_2) & \ldots & (Y_n) \\ (Z_1) & (Z_2) & & (Z_n) \end{bmatrix}$$

and converting the target color parameter to the target color chromaticity coordinate $(x_t,y_t)$ using the color conversion matrix $$\begin{bmatrix} (X_1) & (X_2) & & (X_n) \\ (Y_1) & (Y_2) & \ldots & (Y_n) \\ (Z_1) & (Z_2) & & (Z_n) \end{bmatrix}.$$

Step S13-1 is specifically as follows:
calculating a primary-color tristimulus value $$\begin{bmatrix} X_1 & X_2 & & X_n \\ Y_1 & Y_2 & \ldots & Y_n \\ Z_1 & Z_2 & & Z_n \end{bmatrix}$$

and a white-point tristimulus value $$\begin{bmatrix} X_w \\ Y_w \\ Z_w \end{bmatrix}$$

that correspond to the virtual primary-color chromaticity coordinates $(x_1,y_1)$, $(x_2,y_2)$ ... $(x_n,y_n)$ and the virtual white point chromaticity coordinate $(x_w,y_w)$ respectively when the brightness is maximum and a Y value of the tristimulus value is 1 according to a conversion formula $$\begin{cases} X = \dfrac{x}{y} \\ Z = \dfrac{1-x-y}{y} \end{cases}$$

between a chromaticity coordinate value and a tristimulus value, in which, the values of $Y_1, Y_2 \ldots Y_n$ and $Y_w$ are all 1;

obtaining a conversion formula $$\begin{cases} X = \dfrac{x}{y} \\ Z = \dfrac{1-x-y}{y} \end{cases}$$

between a chromaticity coordinate value and a tristimulus value by conversion when the Y value is 1 due to the conversion formula $$\begin{cases} x = \dfrac{X}{X+Y+Z} \\ y = \dfrac{Y}{X+Y+Z} \end{cases}$$

between a tristimulus value and a chromaticity coordinate value; and substituting the virtual primary-color chromaticity coordinates $(x_1,y_1), (x_2,y_2) \ldots (x_n,y_n)$ and the virtual white point chromaticity coordinate $(x_w,y_w)$ into this conversion formula to obtain corresponding primary-color tristimulus value $$\begin{bmatrix} X_1 & X_2 & & X_n \\ Y_1 & Y_2 & \cdots & Y_n \\ Z_1 & Z_2 & & Z_n \end{bmatrix}$$

and white-point tristimulus value $$\begin{bmatrix} X_w \\ Y_w \\ Z_w \end{bmatrix}$$

when the brightness is maximum, in which, for ease of description, the Y value is still represented by a character without being converted to a value 1.

Step S13-2 is specifically as follows:

S13-2-1: setting duty ratios of each of the primary colors in a mixed color of the color control system respectively as $P_1, P_2, \ldots P_n$, in which $0 \leq P_1, P_2 \ldots P_n \leq 1$, the color may be any color located within the common color gamut, and a tristimulus value of the mixed color according to Grassmann's Law is $$\begin{bmatrix} X \\ Y \\ Z \end{bmatrix} = \begin{bmatrix} (X_1) & (X_2) & & (X_n) \\ (Y_1) & (Y_2) & \cdots & (Y_n) \\ (Z_1) & (Z_2) & & (Z_n) \end{bmatrix} \cdot \begin{bmatrix} P_1 \\ P_2 \\ \vdots \\ P_n \end{bmatrix}, \qquad (1)$$

i.e., the tristimulus value $$\begin{bmatrix} X \\ Y \\ Z \end{bmatrix}$$

of the mixed color equals to a product of the tristimulus value $$\begin{bmatrix} (X_1) & (X_2) & & (X_n) \\ (Y_1) & (Y_2) & \cdots & (Y_n) \\ (Z_1) & (Z_2) & & (Z_n) \end{bmatrix}$$

corresponding to each primary color unit and duty ratios $P_1, P_2, \ldots P_n$ of each of the primary colors in the mixed color;

S13-2-2: setting a linear coefficient between the tristimulus value $$\begin{bmatrix} (X_1) & (X_2) & & (X_n) \\ (Y_1) & (Y_2) & \cdots & (Y_n) \\ (Z_1) & (Z_2) & & (Z_n) \end{bmatrix}$$

for each primary color unit and the tristimulus value $$\begin{bmatrix} X_1 & X_2 & & X_n \\ Y_1 & Y_2 & \cdots & Y_n \\ Z_1 & Z_2 & & Z_n \end{bmatrix}$$

of the virtual primary-color chromaticity coordinates $(x_1, y_1), (x_2,y_2) \ldots (x_n,y_n)$ when the brightness is maximum as $$\begin{bmatrix} K_1 \\ K_2 \\ \vdots \\ K_n \end{bmatrix}$$

since tristimulus values change linearly, then the tristimulus value for each primary color unit becomes $$\begin{bmatrix} (X_1) & (X_2) & & (X_n) \\ (Y_1) & (Y_2) & \cdots & (Y_n) \\ (Z_1) & (Z_2) & & (Z_n) \end{bmatrix} = \begin{bmatrix} X_1 & X_2 & & X_n \\ Y_1 & Y_2 & \cdots & Y_n \\ Z_1 & Z_2 & & Z_n \end{bmatrix} \cdot \begin{bmatrix} K_1 \\ K_2 \\ \vdots \\ K_n \end{bmatrix}; \qquad (2)$$

and combining Formula (1) and Formula (2) to obtain the tristimulus value of the mixed color as $$\begin{bmatrix} X \\ Y \\ Z \end{bmatrix} = \begin{bmatrix} X_1 & X_2 & & X_n \\ Y_1 & Y_2 & \cdots & Y_n \\ Z_1 & Z_2 & & Z_n \end{bmatrix} \cdot \begin{bmatrix} P_1 \\ P_2 \\ \vdots \\ P_n \end{bmatrix} \cdot \begin{bmatrix} K_1 \\ K_2 \\ \vdots \\ K_n \end{bmatrix};$$

S13-2-3: the white point tristimulus value, corresponding to the virtual white point chromaticity coordinate $(x_w,y_w)$ when the brightness is maximum, is known as $$\begin{bmatrix} X_w \\ Y_w \\ Z_w \end{bmatrix}$$

since a primary-color duty ratio when the brightness is maximum is an inverse matrix of $$\begin{bmatrix} P_1 \\ P_2 \\ \vdots \\ P_n \end{bmatrix} = \begin{bmatrix} 1 \\ 1 \\ \vdots \\ 1 \end{bmatrix}, \quad ③$$

then $$\begin{bmatrix} X_w \\ Y_w \\ Z_w \end{bmatrix} = \begin{bmatrix} X_1 & X_2 & & X_n \\ Y_1 & Y_2 & \cdots & Y_n \\ Z_1 & Z_2 & & Z_n \end{bmatrix} \cdot \begin{bmatrix} K_1 \\ K_2 \\ \vdots \\ K_n \end{bmatrix},$$

and $$\begin{bmatrix} K_1 \\ K_2 \\ \vdots \\ K_n \end{bmatrix} = \begin{bmatrix} X_1 & X_2 & & X_n \\ Y_1 & Y_2 & \cdots & Y_n \\ Z_1 & Z_2 & & Z_n \end{bmatrix}^{-1} \cdot \begin{bmatrix} X_w \\ Y_w \\ Z_w \end{bmatrix},$$

in which $$\begin{bmatrix} X_1 & X_2 & & X_n \\ Y_1 & Y_2 & \cdots & Y_n \\ Z_1 & Z_2 & & Z_n \end{bmatrix}^{-1}$$

is an inverse matrix of $$\begin{bmatrix} X_1 & X_2 & & X_n \\ Y_1 & Y_2 & \cdots & Y_n \\ Z_1 & Z_2 & & Z_n \end{bmatrix};$$

and

S13-2-4: substituting values of the linear coefficient $$\begin{bmatrix} K_1 \\ K_2 \\ \vdots \\ K_n \end{bmatrix}$$

calculated in Equation ③ into Equation ② to obtain the values of the color conversion matrix $$\begin{bmatrix} (X_1) & (X_2) & & (X_n) \\ (Y_1) & (Y_2) & \cdots & (Y_n) \\ (Z_1) & (Z_2) & & (Z_n) \end{bmatrix} \text{ as}$$

$$\begin{bmatrix} X_1 & X_2 & & X_n \\ Y_1 & Y_2 & \cdots & Y_n \\ Z_1 & Z_2 & & Z_n \end{bmatrix} \cdot \begin{bmatrix} X_1 & X_2 & & X_n \\ Y_1 & Y_2 & \cdots & Y_n \\ Z_1 & Z_2 & & Z_n \end{bmatrix}^{-1} \cdot \begin{bmatrix} X_w \\ Y_w \\ Z_w \end{bmatrix},$$

in which $$\begin{bmatrix} X_1 & X_2 & & X_n \\ Y_1 & Y_2 & \cdots & Y_n \\ Z_1 & Z_2 & & Z_n \end{bmatrix}$$

is the primary-color tristimulus value corresponding to the virtual primary-color chromaticity coordinates $(x_1,y_1)$, $(x_2,y_2)$ ... $(x_n,y_n)$ when the brightness is maximum, $$\begin{bmatrix} X_1 & X_2 & & X_n \\ Y_1 & Y_2 & \cdots & Y_n \\ Z_1 & Z_2 & & Z_n \end{bmatrix}^{-1}$$

is the inverse matrix of $$\begin{bmatrix} X_1 & X_2 & & X_n \\ Y_1 & Y_2 & \cdots & Y_n \\ Z_1 & Z_2 & & Z_n \end{bmatrix}, \begin{bmatrix} X_w \\ Y_w \\ Z_w \end{bmatrix}$$

is the white point tristimulus value corresponding to the virtual white point chromaticity coordinate $(x_w,y_w)$ when the brightness is maximum, and sequential calculations can result in the values of the color conversion matrix $$\begin{bmatrix} (X_1) & (X_2) & & (X_n) \\ (Y_1) & (Y_2) & \cdots & (Y_n) \\ (Z_1) & (Z_2) & & (Z_n) \end{bmatrix},$$

i.e., the tristimulus values corresponding to each of the primary color units. It should be noted that $$\begin{bmatrix} X_1 & X_2 & & X_n \\ Y_1 & Y_2 & \cdots & Y_n \\ Z_1 & Z_2 & & Z_n \end{bmatrix} \text{ and } \begin{bmatrix} X_1 & X_2 & & X_n \\ Y_1 & Y_2 & \cdots & Y_n \\ Z_1 & Z_2 & & Z_n \end{bmatrix}^{-1}$$

in array operations cannot be simplified and combined, both of which are not reciprocal to each other, as will be appreciated by those skilled in the art.

Step S2 comprises the following steps:

S21: calculating a tristimulus value $$\begin{bmatrix} X_t \\ Y_t \\ Z_t \end{bmatrix}$$

of the target color by the color control system using the color conversion matrix according to the input target color parameter; and S22: converting the target color tristimulus value $$\begin{bmatrix} X_t \\ Y_t \\ Z_t \end{bmatrix}$$

by the color control system to the target color chromaticity coordinate $(x_t,y_t)$ according to the conversion formula $$\begin{cases} x = \dfrac{X}{X+Y+Z} \\ y = \dfrac{Y}{X+Y+Z} \end{cases}$$

between a chromaticity coordinate value and a tristimulus value, in which $(x,y)$ represents the chromaticity coordinate, and $$\begin{bmatrix} X \\ Y \\ Z \end{bmatrix}$$

represents the tristimulus value.

The target color parameter is firstly converted to the target color tristimulus value $$\begin{bmatrix} X_t \\ Y_t \\ Z_t \end{bmatrix},$$

which facilitates converting the target color tristimulus value $$\begin{bmatrix} X_t \\ Y_t \\ Z_t \end{bmatrix}$$

to the target color chromaticity coordinate value $(x_t, y_t)$ according to the conversion formula between the tristimulus value and the chromaticity coordinate value, thereby ultimately converting the target color chromaticity coordinate value by the color implementation system to the primary-color duty ratio $D_i$ of corrected colors.

Setting color implementation in step S1 comprises: measuring the chromaticity coordinate values $(x_i, y_i)$ and a maximum brightness value $Y_i$ of each of the primary colors of different light sources under a maximum duty ratio, in which i represents an i-th primary color, and storing measurement values into corresponding lights. Similar to measuring respective color gamuts of light sources, both the chromaticity coordinate values $(x_i, y_i)$ and a maximum brightness value $Y_i$ of each of the primary colors of different light sources under a maximum duty ratio are measured one by one, model by model, or batch by batch, both of which are measured in the same manner.

Step S3 is specifically as follows:

substituting the target color chromaticity coordinate value $(x_t, y_t)$ and the chromaticity coordinate value $(x_i, y_i)$ and the maximum brightness value $Y_i$ of each of the primary colors of corresponding light sources under a maximum duty ratio into a conversion formula between a tristimulus value and a chromaticity coordinate value to obtain $$x_t = \frac{X_t}{X_t + Y_t + Z_t} = \frac{\sum_{t=1}^{n}[x_t * (X_t + Y_t + Z_t)] * D_t}{\sum_{t=1}^{n}(X_t + Y_t + Z_t) * D_t} = \frac{\sum_{t=1}^{n} \frac{n_t * Y_t}{y_t} * D_t}{\sum_{t=1}^{n} \frac{Y_t}{y_t} * D_t} \text{ and}$$

$$y_t = \frac{Y_t}{X_t + Y_t + Z_t} = \frac{\sum_{t=1}^{n}[y_t * (X_t + Y_t + Z_t)] * D_t}{\sum_{t=1}^{n}(X_t + Y_t + Z_t) * D_t} = \frac{\sum_{t=1}^{n} \frac{y_t * Y_t}{y_t} * D_t}{\sum_{t=1}^{n} \frac{Y_t}{y_t} * D_t},$$

and obtain the following after simplification:

$$\sum_{t=1}^{n} \frac{Y_t * (x_t - x_t)}{y_t} * D_i = 0; \quad (4)$$

$$\sum_{t=1}^{n} \frac{Y_t * (y_t - y_t)}{y_t} * D_i = 0; \quad (5)$$

in which $0 \leq D_i \leq 1$, n is the number of primary colors, i represents an i-th primary color, and the primary-color duty ratio $D_i$ of corrected colors is solved using linear programming in combination with Equation (4) and Equation (5), and Setting an objective function as maximized target color brightness, then max $Z = \sum_{i=1}^{n} Y_i * D_i$ (6);

in which max Z represents the maximum brightness, Equation (4), Equation (5) and Equation (6) are solved using linear programming to obtain the primary-color duty ratio $D_i$ of corrected colors.

DETAILED DESCRIPTION OF THE EMBODIMENT

Figure 1:
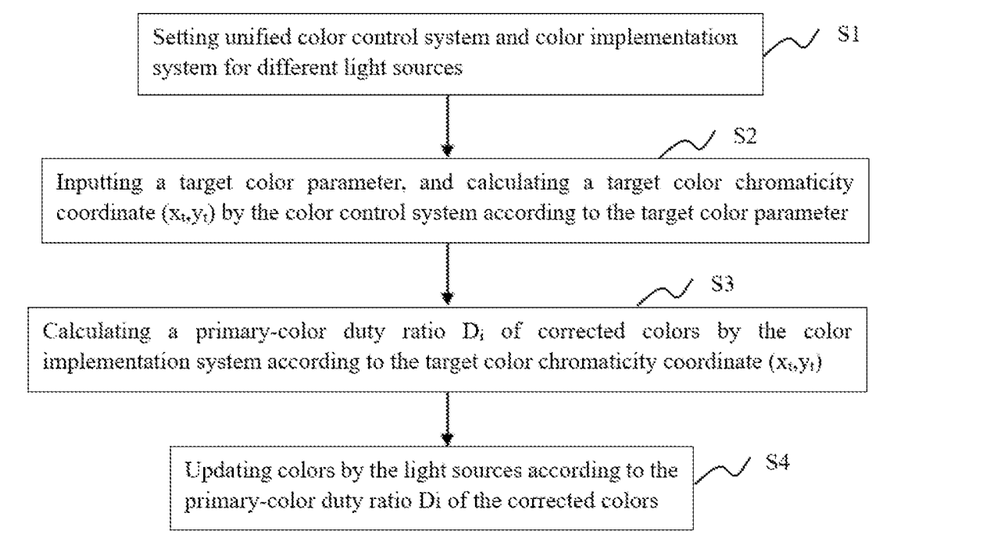
The FIGURE is a schematic diagram according to an embodiment of the present invention.

The drawings are for illustrative purposes only and are not to be construed as limiting the present invention. Some components in the drawings may be omitted, enlarged, or reduced for better illustrating the following embodiments, and sizes of these components do not represent sizes of actual products. For those skilled in the art, it will be understood that some known structures and descriptions thereof in the drawings may be omitted.

As shown in the FIGURE, a unified color control method for a multi-color light is provided according to an embodiment, including the following control steps:

S1: setting unified color control system and color implementation system for different light sources;

S2: inputting a target color parameter, and calculating a target color chromaticity coordinate $(x_t, y_t)$ by the color control system according to the target color parameter;

S3: calculating a primary-color duty ratio $D_i$ of corrected colors by the color implementation system using a linear programming equation according to the target color chromaticity coordinate $(x_t, y_t)$, and a chromaticity coordinate value $(x_i, y_i)$ and a maximum brightness value $Y_i$ of each primary color for each light source under a maximum duty ratio, in which i represents an i-th primary color; and S4: updating colors by the light sources according to the primary-color duty ratio $D_i$ of the corrected colors in step S3.

By providing a unified color control system for a plurality of light sources with the number of primary colors greater than or equal to three, the unified color control method for a multi-color light according to the present embodiment can achieve unified target colors after correction and finally presents consistent corrected colors. When the same color control system is used for light sources of different models of lights, the color control system can correct properties for each light source separately once the same target color parameter is input, thereby avoiding mutual differences between light sources, achieving color synchronization between lights of the same model and different models, and achieving unified light output of corrected colors.

In a preferred embodiment of the present invention, setting a color control system in step S1 comprises the following steps:

S11: measuring respective color gamuts of different light sources to obtain a common color gamut;

S12: selecting virtual primary-color chromaticity coordinates $(x_1, y_1)$, $(x_2, y_2)$ ... $(x_n, y_n)$ and a virtual white point chromaticity coordinate $(x_w, y_w)$ of the color control system within the common color gamut; and S13: calculating a color conversion matrix $$\begin{bmatrix} (X_1) & (X_2) & & (X_n) \\ (Y_1) & (Y_2) & \ldots & (Y_n) \\ (Z_1) & (Z_2) & & (Z_n) \end{bmatrix}$$

for converting the target color parameter to the target color chromaticity coordinate $(x_t, y_t)$ according to the virtual primary-color chromaticity coordinates $(x_1, y_1)$, $(x_2, y_2)$ . . . $(x_n, y_n)$ and the virtual white point chromaticity coordinate $(x_w, y_w)$.

The respective color gamuts of the light sources needs to be measured one by one or model by model or batch by batch to obtain as much color gamut data for each one/each model/each batch of light sources as possible. Considering that even an actual luminous efficiency of the same model/batch of light sources is distinct, it is preferable to perform measurement one by one to precisely unify light emission colors of all light sources.

Preferably, in the present embodiment, the respective color gamuts of the light sources are measured one by one to improve color consistency of multi-color lights as much as possible.

Selecting virtual primary-color chromaticity coordinates $(x_1, y_1)$, $(x_2, y_2)$ . . . $(x_n, y_n)$ and a virtual white point chromaticity coordinate $(x_w, y_w)$ of the color control system within the common color gamut can ensure that different light sources after correction have a common color display range, and avoids that some colors can only be displayed by a part of light sources.

Since the input target color parameter is generally an RGB color value in which the lowest value of each color is 0 and the highest value is 255, the target color parameter is firstly converted to a target color primary-color duty ratio within a multi-color light, which does not facilitate the color implementation system to convert and calculate the primary-color duty ratio of corrected colors. Therefore, the color conversion matrix $$\begin{bmatrix} (X_1) & (X_2) & & (X_n) \\ (Y_1) & (Y_2) & \ldots & (Y_n) \\ (Z_1) & (Z_2) & & (Z_n) \end{bmatrix}$$

can be used to quickly convert the target color primary-color duty ratio to the target color chromaticity coordinate $(x_t, y_t)$ and facilitates conversion with the corrected colors.

In a preferred embodiment of the present invention, step S11 comprises the steps of measuring respective color gamuts of different light sources and recording into a chromaticity diagram to form a plurality of first convex polygons, in which a maximum value of each primary color forms a vertex when recording a color gamut of each light source in the chromaticity diagram, connecting lines of the plurality of vertices forms the first convex polygon, and an intersection of all the first convex polygons is the common color gamut. The common color gamut is a common color interval for all the light sources. The respective color gamuts of different light sources can be measured and recorded automatically using a device, and the common color gamut can be visually obtained using geometric construction within the chromaticity diagram and can also be automatically obtained using software according to the measured respective color gamuts of different light sources.

In a preferred embodiment of the present invention, step S12 comprises the steps of making a second convex polygon with a number n as the number of edges within the common color gamut according to the number n of primary colors required to be virtual, in which n≥3; and setting vertex coordinates of the second convex polygon as $(x_1, y_1)$, $(x_2, y_2)$ . . . $(x_n, y_n)$ respectively, taking the vertex coordinates of the second convex polygon as the virtual primary-color chromaticity coordinates of the color control system, and taking one of the coordinate points in the second convex polygon as the virtual white point chromaticity coordinate $(x_w, y_w)$. The number n of primary colors required to be virtual is a controlled variable number of light sources. The vertices of the second convex polygon can be freely selected as desired so long as the vertices are within the common color gamut. A color range of the corrected colors is the range of the second convex polygon. A larger area of the second convex polygon results in a wider color display range of light sources. Therefore, a second convex polygon with a number n as the number of edges is generally made as large as possible within the common color gamut.

In a preferred embodiment of the present invention, step S13 comprises the following steps:

S13-1: calculating a primary-color tristimulus value $$\begin{bmatrix} X_1 & X_2 & & X_n \\ Y_1 & Y_2 & \ldots & Y_n \\ Z_1 & Z_2 & & Z_n \end{bmatrix}$$

and a white-point tristimulus value $$\begin{bmatrix} X_w \\ Y_w \\ Z_w \end{bmatrix}$$

that correspond to the virtual primary-color chromaticity coordinates $(x_1, y_1)$, $(x_2, y_2)$ . . . $(x_n, y_n)$ and the virtual white point chromaticity coordinate $(x_w, y_w)$ respectively when the brightness is maximum in step S12, a brightness value at this time is 1, i.e., the values of $Y_1, Y_2, \ldots Y_n$ and $Y_w$ are all 1; and S13-2: calculating tristimulus values corresponding to each primary color unit using Grassmann's Law based on the primary-color tristimulus value $$\begin{bmatrix} X_1 & X_2 & & X_n \\ Y_1 & Y_2 & \ldots & Y_n \\ Z_1 & Z_2 & & Z_n \end{bmatrix}$$

and the white-point tristimulus value $$\begin{bmatrix} X_w \\ Y_w \\ Z_w \end{bmatrix}$$

in step S13-1, a tristimulus value corresponding to each primary color unit is a color conversion matrix $$\begin{bmatrix} (X_1) & (X_2) & & (X_n) \\ (Y_1) & (Y_2) & \ldots & (Y_n) \\ (Z_1) & (Z_2) & & (Z_n) \end{bmatrix},$$

thereby solving values of the color conversion matrix $$\begin{bmatrix} (X_1) & (X_2) & & (X_n) \\ (Y_1) & (Y_2) & \ldots & (Y_n) \\ (Z_1) & (Z_2) & & (Z_n) \end{bmatrix}$$

and converting the target color parameter to the target color chromaticity coordinate $(x_t, y_t)$ using the color conversion matrix $$\begin{bmatrix} (X_1) & (X_2) & & (X_n) \\ (Y_1) & (Y_2) & \ldots & (Y_n) \\ (Z_1) & (Z_2) & & (Z_n) \end{bmatrix}.$$

In a preferred embodiment of the present invention, step S13-1 comprises the steps of:
calculating a primary-color tristimulus value $$\begin{bmatrix} X_1 & X_2 & & X_n \\ Y_1 & Y_2 & \ldots & Y_n \\ Z_1 & Z_2 & & Z_n \end{bmatrix}$$

and a white-point tristimulus value $$\begin{bmatrix} X_w \\ Y_w \\ Z_w \end{bmatrix}$$

that correspond to the virtual primary-color chromaticity coordinates $(x_1, y_1)$, $(x_2, y_2)$ ... $(x_n, y_n)$ and the virtual white point chromaticity coordinate $(x_w, y_w)$ respectively when the brightness is maximum and a Y value of the tristimulus value is 1 according to a conversion formula $$\begin{cases} X = \dfrac{x}{y} \\ Z = \dfrac{1-x-y}{y} \end{cases}$$

between a chromaticity coordinate value and a tristimulus value, in which, the values of $Y_1, Y_2, \ldots Y_n$ and $Y_w$ are all 1; and
obtaining a conversion formula $$\begin{cases} X = \dfrac{x}{y} \\ Z = \dfrac{1-x-y}{y} \end{cases}$$

between a chromaticity coordinate value and a tristimulus value by conversion when the Y value is 1 due to that the conversion formula between a tristimulus value and a chromaticity coordinate value is known as $$\begin{cases} x = \dfrac{X}{X+Y+Z} \\ y = \dfrac{Y}{X+Y+Z} \end{cases}$$

by those skilled in the art, and substituting the virtual primary-color chromaticity coordinates $(x_1, y_1)$, $(x_2, y_2)$ ... $(x_n, y_n)$ and the virtual white point chromaticity coordinate $(x_w, y_w)$ into this conversion formula to obtain corresponding primary-color tristimulus value $$\begin{bmatrix} X_1 & X_2 & & X_n \\ Y_1 & Y_2 & \ldots & Y_n \\ Z_1 & Z_2 & & Z_n \end{bmatrix}$$

and white-point tristimulus value $$\begin{bmatrix} X_w \\ Y_w \\ Z_w \end{bmatrix}$$

when the brightness is maximum, in which, for ease of description, the Y value is still represented by a character without being converted to a value 1.

In a preferred embodiment of the present invention, step S13-2 comprises the steps of:
S13-2-1: setting duty ratios of each of the primary colors in a mixed color of the color control system respectively as $P_1, P_2 \ldots P_n$, in which $0 \leq P_1, P_2 \ldots P_n \leq 1$, the color may be any color located within the common color gamut, and a tristimulus value of the mixed color according to Grassmann's Law is $$\begin{bmatrix} X \\ Y \\ Z \end{bmatrix} = \begin{bmatrix} (X_1) & (X_2) & & (X_n) \\ (Y_1) & (Y_2) & \ldots & (Y_n) \\ (Z_1) & (Z_2) & & (Z_n) \end{bmatrix} \cdot \begin{bmatrix} P_1 \\ P_2 \\ \vdots \\ P_n \end{bmatrix}, \quad \text{①}$$

i.e., the tristimulus value $$\begin{bmatrix} X \\ Y \\ Z \end{bmatrix}$$

of the mixed color equals to a product of the tristimulus value $$\begin{bmatrix} (X_1) & (X_2) & & (X_n) \\ (Y_1) & (Y_2) & \ldots & (Y_n) \\ (Z_1) & (Z_2) & & (Z_n) \end{bmatrix}$$

corresponding to each primary color unit and duty ratios $P_1, P_2 \ldots P_n$ of each of the primary colors in the mixed color;
S13-2-2: setting a linear coefficient between the tristimulus value $$\begin{bmatrix} (X_1) & (X_2) & & (X_n) \\ (Y_1) & (Y_2) & \ldots & (Y_n) \\ (Z_1) & (Z_2) & & (Z_n) \end{bmatrix}$$

for each primary color unit and the tristimulus value $$\begin{bmatrix} X_1 & X_2 & & X_n \\ Y_1 & Y_2 & \ldots & Y_n \\ Z_1 & Z_2 & & Z_n \end{bmatrix}$$

of the virtual primary-color chromaticity coordinates $(x_1, y_1), (x_2, y_2) \ldots (x_n, y_n)$ when the brightness is maximum as $$\begin{bmatrix} K_1 \\ K_2 \\ \vdots \\ K_n \end{bmatrix}$$

since tristimulus values change linearly, then the tristimulus value for each primary color unit becomes $$\begin{bmatrix} (X_1) & (X_2) & & (X_n) \\ (Y_1) & (Y_2) & \ldots & (Y_n) \\ (Z_1) & (Z_2) & & (Z_n) \end{bmatrix} = \begin{bmatrix} X_1 & X_2 & & X_n \\ Y_1 & Y_2 & \ldots & Y_n \\ Z_1 & Z_2 & & Z_n \end{bmatrix} \cdot \begin{bmatrix} K_1 \\ K_2 \\ \vdots \\ K_n \end{bmatrix}; \quad ②$$

combining Formula ① and Formula ② to obtain the tristimulus value of the mixed $$\begin{bmatrix} X \\ Y \\ Z \end{bmatrix} = \begin{bmatrix} X_1 & X_2 & & X_n \\ Y_1 & Y_2 & \ldots & Y_n \\ Z_1 & Z_2 & & Z_n \end{bmatrix} \cdot \begin{bmatrix} P_1 \\ P_2 \\ \vdots \\ P_n \end{bmatrix} \cdot \begin{bmatrix} K_1 \\ K_2 \\ \vdots \\ K_n \end{bmatrix};$$

S13-2-3: the white point tristimulus value, corresponding to the virtual white point chromaticity coordinate $(x_w, y_w)$ when the brightness is maximum, is known as $$\begin{bmatrix} X_w \\ Y_w \\ Z_w \end{bmatrix},$$

since a primary-color duty ratio when the brightness is maximum is $$\begin{bmatrix} P_1 \\ P_2 \\ \vdots \\ P_n \end{bmatrix} = \begin{bmatrix} 1 \\ 1 \\ \vdots \\ 1 \end{bmatrix},$$

then $$\begin{bmatrix} X_w \\ Y_w \\ Z_w \end{bmatrix} = \begin{bmatrix} X_1 & X_2 & & X_n \\ Y_1 & Y_2 & \ldots & Y_n \\ Z_1 & Z_2 & & Z_n \end{bmatrix} \cdot \begin{bmatrix} K_1 \\ K_2 \\ \vdots \\ K_n \end{bmatrix}, \text{ and} \quad ③$$

$$\begin{bmatrix} K_1 \\ K_2 \\ \vdots \\ K_n \end{bmatrix} = \begin{bmatrix} X_1 & X_2 & & X_n \\ Y_1 & Y_2 & \ldots & Y_n \\ Z_1 & Z_2 & & Z_n \end{bmatrix}^{-1} \cdot \begin{bmatrix} X_w \\ Y_w \\ Z_w \end{bmatrix},$$

in which $$\begin{bmatrix} X_1 & X_2 & & X_n \\ Y_1 & Y_2 & \ldots & Y_n \\ Z_1 & Z_2 & & Z_n \end{bmatrix}^{-1}$$

is an inverse matrix of $$\begin{bmatrix} X_1 & X_2 & & X_n \\ Y_1 & Y_2 & \ldots & Y_n \\ Z_1 & Z_2 & & Z_n \end{bmatrix};$$

and

S13-2-4: substituting values of the linear coefficient $$\begin{bmatrix} K_1 \\ K_2 \\ \vdots \\ K_n \end{bmatrix}$$

calculated in Equation ③ into Equation ② to obtain the values of the color conversion matrix $$\begin{bmatrix} (X_1) & (X_2) & & (X_n) \\ (Y_1) & (Y_2) & \ldots & (Y_n) \\ (Z_1) & (Z_2) & & (Z_n) \end{bmatrix} \text{ as}$$

$$\begin{bmatrix} X_1 & X_2 & & X_n \\ Y_1 & Y_2 & \ldots & Y_n \\ Z_1 & Z_2 & & Z_n \end{bmatrix} \cdot \begin{bmatrix} X_1 & X_2 & & X_n \\ Y_1 & Y_2 & \ldots & Y_n \\ Z_1 & Z_2 & & Z_n \end{bmatrix}^{-1} \cdot \begin{bmatrix} X_w \\ Y_w \\ Z_w \end{bmatrix},$$

in which $$\begin{bmatrix} X_1 & X_2 & & X_n \\ Y_1 & Y_2 & \ldots & Y_n \\ Z_1 & Z_2 & & Z_n \end{bmatrix}$$

is the primary-color tristimulus value corresponding to the virtual primary-color chromaticity coordinates $(x_1, y_1), (x_2, y_2) \ldots (x_n, y_n)$ when the brightness is maximum, $$\begin{bmatrix} X_1 & X_2 & & X_n \\ Y_1 & Y_2 & \ldots & Y_n \\ Z_1 & Z_2 & & Z_n \end{bmatrix}^{-1}$$

is the inverse matrix of $$\begin{bmatrix} X_1 & X_2 & & X_n \\ Y_1 & Y_2 & \ldots & Y_n \\ Z_1 & Z_2 & & Z_n \end{bmatrix}, \begin{bmatrix} X_w \\ Y_w \\ Z_w \end{bmatrix}$$

is the white point tristimulus value corresponding to the virtual white point chromaticity coordinate $(x_w, y_w)$ when the brightness is maximum, and sequential calculations can result in the values of the color conversion matrix $$\begin{bmatrix} (X_1) & (X_2) & & (X_n) \\ (Y_1) & (Y_2) & \ldots & (Y_n) \\ (Z_1) & (Z_2) & & (Z_n) \end{bmatrix},$$

i.e., the tristimulus values corresponding to each of the primary color units.

It should be noted that $$\begin{bmatrix} X_1 & X_2 & & X_n \\ Y_1 & Y_2 & \ldots & Y_n \\ Z_1 & Z_2 & & Z_n \end{bmatrix} \text{ and } \begin{bmatrix} X_1 & X_2 & & X_n \\ Y_1 & Y_2 & \ldots & Y_n \\ Z_1 & Z_2 & & Z_n \end{bmatrix}^{-1}$$

in array operations cannot be simplified and combined, both of which are not reciprocal to each other, as will be appreciated by those skilled in the art. For solving the inverse matrix $$\begin{bmatrix} X_1 & X_2 & & X_n \\ Y_1 & Y_2 & \ldots & Y_n \\ Z_1 & Z_2 & & Z_n \end{bmatrix}^{-1},$$

only when n=3, the equation to be solved has a unique solution, i.e., a unique inverse matrix $$\begin{bmatrix} X_1 & X_2 & & X_n \\ Y_1 & Y_2 & \ldots & Y_n \\ Z_1 & Z_2 & & Z_n \end{bmatrix}^{-1},$$

and when n>3, the solution to be solved has a plurality of solutions. According to the solution of the present invention, let $$\begin{bmatrix} X_1 & X_2 & & X_n \\ Y_1 & Y_2 & \ldots & Y_n \\ Z_1 & Z_2 & & Z_n \end{bmatrix}^{-1}$$

be a generalized inverse matrix. Since the specific solution of the generalized inverse matrix is well known by those skilled in the art, details are not repeated in the present application.

In a preferred embodiment of the present invention, step S2 comprises the following steps:

S21: calculating a tristimulus value $$\begin{bmatrix} X_t \\ Y_t \\ Z_t \end{bmatrix}$$

of the target color by the color control system using the color conversion matrix according to the input target color parameter. Specifically, when the input target color parameter is an RGB color value, the color control system firstly converts the target color parameter to the target color primary-color duty ratio within the multi-color light, and then uses a product of the color conversion matrix and the target color primary-color duty ratio to obtain the target color tristimulus value $$\begin{bmatrix} X_t \\ Y_t \\ Z_t \end{bmatrix}.$$

In the present embodiment, when the color control system is set, the color conversion matrix $$\begin{bmatrix} (X_1) & (X_2) & & (X_n) \\ (Y_1) & (Y_2) & \ldots & (Y_n) \\ (Z_1) & (Z_2) & & (Z_n) \end{bmatrix} = \begin{bmatrix} X_1 & X_2 & & X_n \\ Y_1 & Y_2 & \ldots & Y_n \\ Z_1 & Z_2 & & Z_n \end{bmatrix} \cdot \begin{bmatrix} X_1 & X_2 & & X_n \\ Y_1 & Y_2 & \ldots & Y_n \\ Z_1 & Z_2 & & Z_n \end{bmatrix}^{-1} \cdot \begin{bmatrix} X_w \\ Y_w \\ Z_w \end{bmatrix}$$

has been solved in step S13-2-4.

S22: converting the target color tristimulus value $$\begin{bmatrix} X_t \\ Y_t \\ Z_t \end{bmatrix}$$

by the color control system to the target color chromaticity coordinate $(x_t, y_t)$ according to the conversion formula $$\begin{cases} x = \dfrac{X}{X+Y+Z} \\ y = \dfrac{Y}{X+Y+Z} \end{cases}$$

between a chromaticity coordinate value and a tristimulus value, in which (x,y) represents the chromaticity coordinate, and $$\begin{bmatrix} X \\ Y \\ Z \end{bmatrix}$$

represents the tristimulus value.

The target color parameter is firstly converted to the target color tristimulus value $$\begin{bmatrix} X_t \\ Y_t \\ Z_t \end{bmatrix},$$

which facilitates converting the target color tristimulus value $$\begin{bmatrix} X_t \\ Y_t \\ Z_t \end{bmatrix}$$

to the target color chromaticity coordinate value $(x_t, y_t)$ according to the conversion formula between the tristimulus value and the chromaticity coordinate value, thereby ultimately converting the target color chromaticity coordinate value by the color implementation system to the primary-color duty ratio $D_i$ of corrected colors.

In a preferred embodiment of the present invention, setting color implementation in step S1 comprises the steps of: measuring the chromaticity coordinate values $(x_i, y_i)$ and a maximum brightness value $Y_i$ of each of the primary colors of different light sources under a maximum duty ratio, in which i represents an i-th primary color, and storing measurement values into corresponding lights.

In a process of setting the color control system, it is desirable to measure respective color gamuts of different light sources and record into a chromaticity diagram to form a plurality of first convex polygons, the vertex coordinates of each of the first convex polygons are the chromaticity coordinate values $(x_i, y_i)$ of each of the primary colors of the corresponding light source under a maximum duty ratio, and the chromaticity coordinates can be directly measured by an integrating sphere. When measured, only one of the primary colors of the light source is turned on while other primary colors of the light source are turned off, the illuminated primary color is under the maximum duty ratio (the duty cycle at this time is generally considered to be 1), and then the chromaticity coordinate value $(x_i, y_i)$ and the brightness value $Y_i$ are measured.

Optionally, similar to measuring respective color gamuts of different light sources, both the chromaticity coordinate values $(x_i, y_i)$ and a maximum brightness value $Y_i$ of each of the primary colors of different light sources under a maximum duty ratio are measured one by one, model by model, or batch by batch, both of which are measured in the same manner.

Optionally, there may be one light source or a plurality of light sources within each multi-color light, and when there are a plurality of light sources within one multi-color light, similar to measuring respective color gamuts of different light sources, each one/each model/each batch of light sources needs to be corrected, both of which are measured in the same manner to unify light emission colors of the plurality of light sources within the same multi-color light.

Preferably, in the present embodiment, there is only one light source, or two and more light sources of the same model inside the multi-color light.

In a preferred embodiment of the present invention, step S3 comprises the steps of:

substituting the target color chromaticity coordinate value $(x_t, y_t)$ and the chromaticity coordinate value $(x_i, y_i)$ and the maximum brightness value $Y_i$ of each of the primary colors of corresponding light sources under a maximum duty ratio into a conversion formula between a tristimulus value and a chromaticity coordinate value to obtain $$x_t = \frac{X_t}{X_t + Y_t + Z_t} = \frac{\sum_{i=1}^{n}[x_t*(X_t+Y_t+Z_t)]*D_i}{\sum_{i=1}^{n}(X_t+Y_t+Z_t)*D_i} = \frac{\sum_{i=1}^{n}\frac{x_t*Y_t}{y_i}*D_i}{\sum_{i=1}^{n}\frac{Y_t}{y_i}*D_i} \text{ and}$$

$$y_t = \frac{Y_t}{X_t + Y_t + Z_t} = \frac{\sum_{i=1}^{n}[y_t*(X_t+Y_t+Z_t)]*D_i}{\sum_{i=1}^{n}(X_t+Y_t+Z_t)*D_i} = \frac{\sum_{i=1}^{n}\frac{y_t*Y_t}{y_i}*D_i}{\sum_{i=1}^{n}\frac{Y_t}{y_i}*D_i},$$

and obtain the following after simplification:

$$\sum_{i=1}^{n}\frac{Y_t*(x_t-x_i)}{y_i}*D_i = 0; \quad (4)$$

$$\sum_{i=1}^{n}\frac{Y_t*(y_t-y_i)}{y_i}*D_i = 0; \quad (5)$$

in which $0 \leq D_i \leq 1$, n is the number of primary colors, i represents an i-th primary color, and the primary-color duty ratio $D_i$ of corrected colors is solved using linear programming in combination with Equation (4) and Equation (5).

In a preferred embodiment of the present invention, an objective function is set as maximized target color brightness, then max $Z=\Sigma_{i=1}^{n}Y_i*D_i$ (6), in which max Z represents the maximum brightness, Equation (4), Equation (5) and Equation (6) are solved using linear programming to obtain the primary-color duty ratio $D_i$ of corrected colors.

Obviously, the above embodiments of the present invention are merely examples for clear illustration of the technical solutions of the present invention, and are not intended to limit the implementation of the present invention. Any modification, equivalent substitution, improvement or the like within the spirit and principle of claims of the present invention should be included in the scope of the claims of the present invention.

The invention claimed is:

1. A unified color control method for a multi-color light, comprising the following control steps:
   S1: setting unified color control system and color implementation system for different light sources;
   S2: inputting a target color parameter, and calculating a target color chromaticity coordinate $(x_t, y_t)$ by the color control system according to the target color parameter;
   S3: calculating a primary-color duty ratio $D_i$ of corrected colors by the color implementation system using a linear programming equation according to the target color chromaticity coordinate $(x_t, y_t)$, and a chromaticity coordinate value $(x_i, y_i)$ and a maximum brightness value $Y_i$ of each primary color for each light source under a maximum duty ratio, wherein i represents an i-th primary color; and
   S4: updating colors by the light sources according to the primary-color duty ratio $D_i$ of the corrected colors in step S3.

2. The unified color control method for the multi-color light according to claim 1, wherein setting a color control system in step S1 comprises the following steps:
   S11: measuring respective color gamuts of different light sources to obtain a common color gamut;
   S12: selecting virtual primary-color chromaticity coordinates $(x_1, y_1), (x_2, y_2) \ldots (x_n, y_n)$ and a virtual white point chromaticity coordinate $(x_w, y_w)$ of the color control system within the common color gamut; and
   S13: calculating a color conversion matrix $$\begin{bmatrix} (X_1) & (X_2) & & (X_n) \\ (Y_1) & (Y_2) & \ldots & (Y_n) \\ (Z_1) & (Z_2) & & (Z_n) \end{bmatrix}$$

for converting the target color parameter to the target color chromaticity coordinate $(x_t, y_t)$ according to the virtual primary-color chromaticity coordinates $(x_1, y_1), (x_2, y_2) \ldots (x_n, y_n)$ and the virtual white point chromaticity coordinate $(x_w, y_w)$.

3. The unified color control method for the multi-color light according to claim 2, wherein step S11 comprises the steps of:
   measuring respective color gamuts of different light sources and recording into a chromaticity diagram to form a plurality of first convex polygons, wherein an intersection of all the first convex polygons is the common color gamut.

4. The unified color control method for a multi-color light according to claim 2, wherein step S12 comprises the steps of:

making a second convex polygon with a number n as the number of edges within the common color gamut according to the number n of primary colors required to be virtual, in which n is no less than 3; and setting vertex coordinates of the second convex polygon as $(x_1,y_1)$, $(x_2,y_2)$ ... $(x_n,y_n)$ respectively, taking the vertex coordinates of the second convex polygon as the virtual primary-color chromaticity coordinates of the color control system, and taking one of the coordinate points in the second convex polygon as the virtual white point chromaticity coordinate $(x_w,y_w)$.

5. The unified color control method for the multi-color light according to claim 2, wherein step S13 comprises the following steps:

S13-1: calculating a primary-color tristimulus value $$\begin{bmatrix} X_1 & X_2 & & X_n \\ Y_1 & Y_2 & \ldots & Y_n \\ Z_1 & Z_2 & & Z_n \end{bmatrix}$$

and a white-point tristimulus value $$\begin{bmatrix} X_w \\ Y_w \\ Z_w \end{bmatrix}$$

that correspond to the virtual primary-color chromaticity coordinates $(x_1,y_1)$, $(x_2,y_2)$ ... $(x_n,y_n)$ and the virtual white point chromaticity coordinate $(x_w,y_w)$ respectively when the brightness is maximum in step S12; and S13-2: calculating tristimulus values, i.e., the color conversion matrix $$\begin{bmatrix} (X_1) & (X_2) & & (X_n) \\ (Y_1) & (Y_2) & \ldots & (Y_n) \\ (Z_1) & (Z_2) & & (Z_n) \end{bmatrix},$$

corresponding to each of the primary color units using Grassmann's Law based on the primary-color tristimulus value $$\begin{bmatrix} X_1 & X_2 & & X_n \\ Y_1 & Y_2 & \ldots & Y_n \\ Z_1 & Z_2 & & Z_n \end{bmatrix}$$

and the white-point tristimulus value $$\begin{bmatrix} X_w \\ Y_w \\ Z_w \end{bmatrix}$$

in step S13-1.

6. The unified color control method for the multi-color light according to claim 5, wherein step S13-1 is specifically as follows:

calculating a primary-color tristimulus value $$\begin{bmatrix} X_1 & X_2 & & X_n \\ Y_1 & Y_2 & \ldots & Y_n \\ Z_1 & Z_2 & & Z_n \end{bmatrix}$$

and a white-point tristimulus value $$\begin{bmatrix} X_w \\ Y_w \\ Z_w \end{bmatrix}$$

that correspond to the virtual primary-color chromaticity coordinates $(x_1,y_1)$, $(x_2,y_2)$ ... $(x_n,y_n)$ and the virtual white point chromaticity coordinate $(x_w,y_w)$ respectively when the brightness is maximum and a Y value of the tristimulus value is 1 according to a conversion formula $$\begin{cases} X = \dfrac{x}{y} \\ Z = \dfrac{1-x-y}{y} \end{cases}$$

between a chromaticity coordinate value and a tristimulus value, wherein, the values of $Y_1, Y_2 \ldots Y_n$ and $Y_w$ are all 1.

7. The unified color control method for the multi-color light according to claim 5, wherein step S13-2 comprises the steps of:

S13-2-1: setting duty ratios of each of the primary colors in a mixed color of the color control system respectively as $P_1, P_2 \ldots P_n$, $0 \leq P_1, P_2 \ldots P_n \leq 1$, and a tristimulus value of the mixed color according to Grassmann's Law is $$\begin{bmatrix} X \\ Y \\ Z \end{bmatrix} = \begin{bmatrix} (X_1) & (X_2) & & (X_n) \\ (Y_1) & (Y_2) & \ldots & (Y_n) \\ (Z_1) & (Z_2) & & (Z_n) \end{bmatrix} \cdot \begin{bmatrix} P_1 \\ P_2 \\ \vdots \\ P_n \end{bmatrix}; \quad ①$$

S13-2-2: setting a linear coefficient between the tristimulus value $$\begin{bmatrix} (X_1) & (X_2) & & (X_n) \\ (Y_1) & (Y_2) & \ldots & (Y_n) \\ (Z_1) & (Z_2) & & (Z_n) \end{bmatrix}$$

for each primary color unit and the tristimulus value $$\begin{bmatrix} X_1 & X_2 & & X_n \\ Y_1 & Y_2 & \ldots & Y_n \\ Z_1 & Z_2 & & Z_n \end{bmatrix}$$

of the virtual primary-color chromaticity coordinates $(x_1, y_1)$, $(x_2,y_2)$ ... $(x_n,y_n)$ when the brightness is maximum as $$\begin{bmatrix} K_1 \\ K_2 \\ \vdots \\ K_n \end{bmatrix}, \text{ then } \begin{bmatrix} (X_1) & (X_2) & & (X_n) \\ (Y_1) & (Y_2) & \ldots & (Y_n) \\ (Z_1) & (Z_2) & & (Z_n) \end{bmatrix} = \begin{bmatrix} X_1 & X_2 & & X_n \\ Y_1 & Y_2 & \ldots & Y_n \\ Z_1 & Z_2 & & Z_n \end{bmatrix} \cdot \begin{bmatrix} K_1 \\ K_2 \\ \vdots \\ K_n \end{bmatrix}; \quad ②$$

and combining Formula ① and Formula ② to obtain $$\begin{bmatrix} X \\ Y \\ Z \end{bmatrix} = \begin{bmatrix} X_1 & X_2 & & X_n \\ Y_1 & Y_2 & \dots & Y_n \\ Z_1 & Z_2 & & Z_n \end{bmatrix} \cdot \begin{bmatrix} P_1 \\ P_2 \\ \vdots \\ P_n \end{bmatrix} \cdot \begin{bmatrix} K_1 \\ K_2 \\ \vdots \\ K_n \end{bmatrix};$$

S13-2-3: the white point tristimulus value, corresponding to the virtual white point chromaticity coordinate ($x_w$, $y_w$) when the brightness is maximum, is known as $$\begin{bmatrix} X_w \\ Y_w \\ Z_w \end{bmatrix},$$

since the primary-color duty ratio at this time is $$\begin{bmatrix} P_1 \\ P_2 \\ \vdots \\ P_n \end{bmatrix} = \begin{bmatrix} 1 \\ 1 \\ \vdots \\ 1 \end{bmatrix},$$

then $$\begin{bmatrix} X_w \\ Y_w \\ Z_w \end{bmatrix} = \begin{bmatrix} X_1 & X_2 & & X_n \\ Y_1 & Y_2 & \dots & Y_n \\ Z_1 & Z_2 & & Z_n \end{bmatrix} \cdot \begin{bmatrix} K_1 \\ K_2 \\ \vdots \\ K_n \end{bmatrix}, \text{ and}$$

$$\begin{bmatrix} K_1 \\ K_2 \\ \vdots \\ K_n \end{bmatrix} = \begin{bmatrix} X_1 & X_2 & & X_n \\ Y_1 & Y_2 & \dots & Y_n \\ Z_1 & Z_2 & & Z_n \end{bmatrix}^{-1} \cdot \begin{bmatrix} X_w \\ Y_w \\ Z_w \end{bmatrix},$$

wherein $$\begin{bmatrix} X_1 & X_2 & & X_n \\ Y_1 & Y_2 & \dots & Y_n \\ Z_1 & Z_2 & & Z_n \end{bmatrix}^{-1}$$

is an inverse matrix of $$\begin{bmatrix} X_1 & X_2 & & X_n \\ Y_1 & Y_2 & \dots & Y_n \\ Z_1 & Z_2 & & Z_n \end{bmatrix};$$

and

S13-2-4: substituting values of the linear coefficient $$\begin{bmatrix} K_1 \\ K_2 \\ \vdots \\ K_n \end{bmatrix}$$

calculated in Equation ③ into Equation ② to obtain the values of the color conversion matrix $$\begin{bmatrix} (X_1) & (X_2) & & (X_n) \\ (Y_1) & (Y_2) & \dots & (Y_n) \\ (Z_1) & (Z_2) & & (Z_n) \end{bmatrix}.$$

8. The unified color control method for the multi-color light according to claim 1, wherein step S2 comprises the following steps:

S21: calculating a tristimulus value $$\begin{bmatrix} X_t \\ Y_t \\ Z_t \end{bmatrix}$$

of the target color by the color control system using the color conversion matrix according to the input target color parameter; and S22: converting the target color tristimulus value $$\begin{bmatrix} X_t \\ Y_t \\ Z_t \end{bmatrix}$$

by the color control system to the target color chromaticity coordinate ($x_t$,$y_t$) according to the conversion formula $$\begin{cases} x = \dfrac{X}{X+Y+Z} \\ y = \dfrac{Y}{X+Y+Z} \end{cases}$$

between a chromaticity coordinate value and a tristimulus value, wherein (x,y) represents the chromaticity coordinate, and $$\begin{bmatrix} X \\ Y \\ Z \end{bmatrix}$$

represents the tristimulus value.

9. The unified color control method for the multi-color light according to claim 1, wherein setting color implementation in step S comprises: measuring the chromaticity coordinate values ($x_i$,$y_i$) and a maximum brightness value $Y_i$ of each of the primary colors of different light sources under a maximum duty ratio, wherein i represents an i-th primary color, and storing measurement values into corresponding lights.

10. The unified color control method for the multi-color light according to claim 1, wherein step S3 is specifically as follows:

substituting the target color chromaticity coordinate value ($x_t$,$y_t$) and the chromaticity coordinate value ($x_i$,$y_i$) and the maximum brightness value $Y_i$ of each of the primary colors of corresponding light sources under a maximum duty ratio into a conversion formula between a tristimulus value and a chromaticity coordinate value to obtain $$\sum_{i=1}^{n} \frac{Y_i * (x_t - y_i)}{y_i} * D_i = 0; \qquad (4)$$

$$\sum_{i=1}^{n} \frac{Y_i * (y_t - y_i)}{y_i} * D_i = 0; \qquad (5)$$

wherein $0 \leq D_i \leq 1$, n is the number of primary colors, i represents an i-th primary color, and the primary-color duty ratio $D_i$ of corrected colors is solved using linear programming in combination with Equation ④ and Equation ⑤.

11. The unified color control method for the multi-color light according to claim 10, wherein setting an objective function as maximized target color brightness, max $Z=\sum_{i=1}^{n} Y_i * D_i$ ⑥;

wherein max Z represents the maximum brightness, Equation ④, Equation ⑤ and Equation ⑥ are solved using linear programming to obtain the primary-color duty ratio $D_i$ of the corrected colors.

\* \* \* \* \*